(12) United States Patent
Kim

(10) Patent No.: US 12,330,897 B2
(45) Date of Patent: Jun. 17, 2025

(54) TAPE ATTACHMENT APPARATUS OF BATTERY CELL

(71) Applicant: LG CHEM, LTD., Seoul (KR)

(72) Inventor: Min Chan Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 741 days.

(21) Appl. No.: 16/764,190

(22) PCT Filed: Sep. 6, 2019

(86) PCT No.: PCT/KR2019/011519
§ 371 (c)(1),
(2) Date: May 14, 2020

(87) PCT Pub. No.: WO2020/071649
PCT Pub. Date: Apr. 9, 2020

(65) Prior Publication Data
US 2020/0385229 A1 Dec. 10, 2020

(30) Foreign Application Priority Data
Oct. 5, 2018 (KR) .......................... 10-2018-0119086

(51) Int. Cl.
*B65H 35/00* (2006.01)
*H01M 10/04* (2006.01)
*H01M 50/124* (2021.01)

(52) U.S. Cl.
CPC .... *B65H 35/0086* (2013.01); *H01M 10/0404* (2013.01); *H01M 50/124* (2021.01)

(58) Field of Classification Search
CPC . B26D 1/08; B26D 1/085; B26D 7/08; B26D 7/088; B26D 2007/208; B26D 5/02;
(Continued)

(56) References Cited

U.S. PATENT DOCUMENTS

| 4,522,679 | A | 6/1985 | Funakoshi et al. |
| 10,549,443 | B2 * | 2/2020 | McDonald ............. B26D 7/086 |

(Continued)

FOREIGN PATENT DOCUMENTS

| CN | 108372528 A | 8/2018 |
| CN | 207731960 U | 8/2018 |

(Continued)

OTHER PUBLICATIONS

English translation of KR 200385958 (Year: 2006).*
(Continued)

*Primary Examiner* — Evan H MacFarlane
(74) *Attorney, Agent, or Firm* — Morgan, Lewis & Bockius LLP

(57) ABSTRACT

A tape attachment apparatus includes a tape feed unit configured to feed a tape to a battery cell; and a tape cutting unit configured to cut the tape fed from the tape feed unit. The tape cutting unit includes a cutter having a cutting blade with a larger width than a width of the tape and configured to cut the tape; a cutter elevation module configured to move the cutter in a Z-axis direction being perpendicular to a surface of the tape; and a cutter movement module configured to move the cutter in a Y-axis direction being perpendicular to a feeding direction of the tape.

11 Claims, 7 Drawing Sheets

(58) Field of Classification Search
CPC ...... B26D 5/04; B26D 5/06; B26D 2007/005; B26D 2007/0025; B65H 35/00; B65H 35/0013; B65H 35/0026; B65H 35/008; B65H 35/0086; B65H 35/04; B65H 35/06; H01M 10/0404
See application file for complete search history.

(56) References Cited

U.S. PATENT DOCUMENTS

| | | | |
|---|---|---|---|
| 10,780,601 B2* | 9/2020 | Hilton | B26D 7/204 |
| 2009/0127145 A1 | 5/2009 | Nonaka et al. | |
| 2009/0205679 A1 | 8/2009 | Yamamoto et al. | |
| 2010/0196077 A1* | 8/2010 | Jo | B41J 3/4075 |
| | | | 400/621 |
| 2011/0088526 A1 | 4/2011 | Nonaka et al. | |
| 2015/0239140 A1* | 8/2015 | Majestic | B26D 9/00 |
| | | | 83/52 |
| 2015/0295273 A1* | 10/2015 | Kim | H01M 10/0404 |
| | | | 29/730 |
| 2016/0304306 A1* | 10/2016 | Ishibashi | B65H 23/0326 |
| 2018/0309092 A1* | 10/2018 | Fujishima | H01M 10/0404 |
| 2019/0131659 A1* | 5/2019 | Nam | H01M 10/0459 |
| 2019/0217550 A1* | 7/2019 | Lee | B29C 63/02 |
| 2020/0083555 A1* | 3/2020 | Kim | H01M 10/0404 |

FOREIGN PATENT DOCUMENTS

| | | | |
|---|---|---|---|
| CN | 207909992 U | | 9/2018 |
| JP | 6-297393 A | | 10/1994 |
| JP | 2001-247226 A | | 9/2001 |
| JP | 2001-302075 A | | 10/2001 |
| JP | 2002-219686 A | | 8/2002 |
| JP | 2003-094380 A | | 4/2003 |
| JP | 2006-86245 A | | 3/2006 |
| JP | 2007-44772 A | | 2/2007 |
| JP | 2007-106549 A | | 4/2007 |
| JP | 2008-207278 A | | 9/2008 |
| JP | 2011-171418 A | | 9/2011 |
| JP | 2013-515352 A | | 5/2013 |
| JP | 2014-065091 A | | 4/2014 |
| JP | 2015-134401 A | * | 7/2015 |
| JP | WO2013/136952 | * | 8/2015 ............... B26D 5/14 |
| JP | 2016-020021 A | | 2/2016 |
| JP | 2018-012158 A | | 1/2018 |
| KR | 20-0385958 Y1 | | 2/2006 |
| KR | 10-2009-0088809 A | | 8/2009 |
| KR | 10-2010-0062303 A | | 6/2010 |
| KR | 10-2012-0037673 A | | 4/2012 |
| KR | 10-1357863 B1 | | 1/2014 |
| KR | 10-2018-0007912 A | | 1/2018 |

OTHER PUBLICATIONS

Search Report issued in corresponding Chinese Patent Application No. 2019800055217, dated Mar. 3, 2021.
Office Action dated May 6, 2021, issued in corresponding Korean Patent Application No. 10-2018-0119086.
International Search Report issued in corresponding International Patent Application No. PCT/KR2019/011519, dated Dec. 20, 2019.
Office Action dated May 10, 2021, issued in corresponding Japanese Patent Application No. 2020-520814.

* cited by examiner

[FIG. 1]
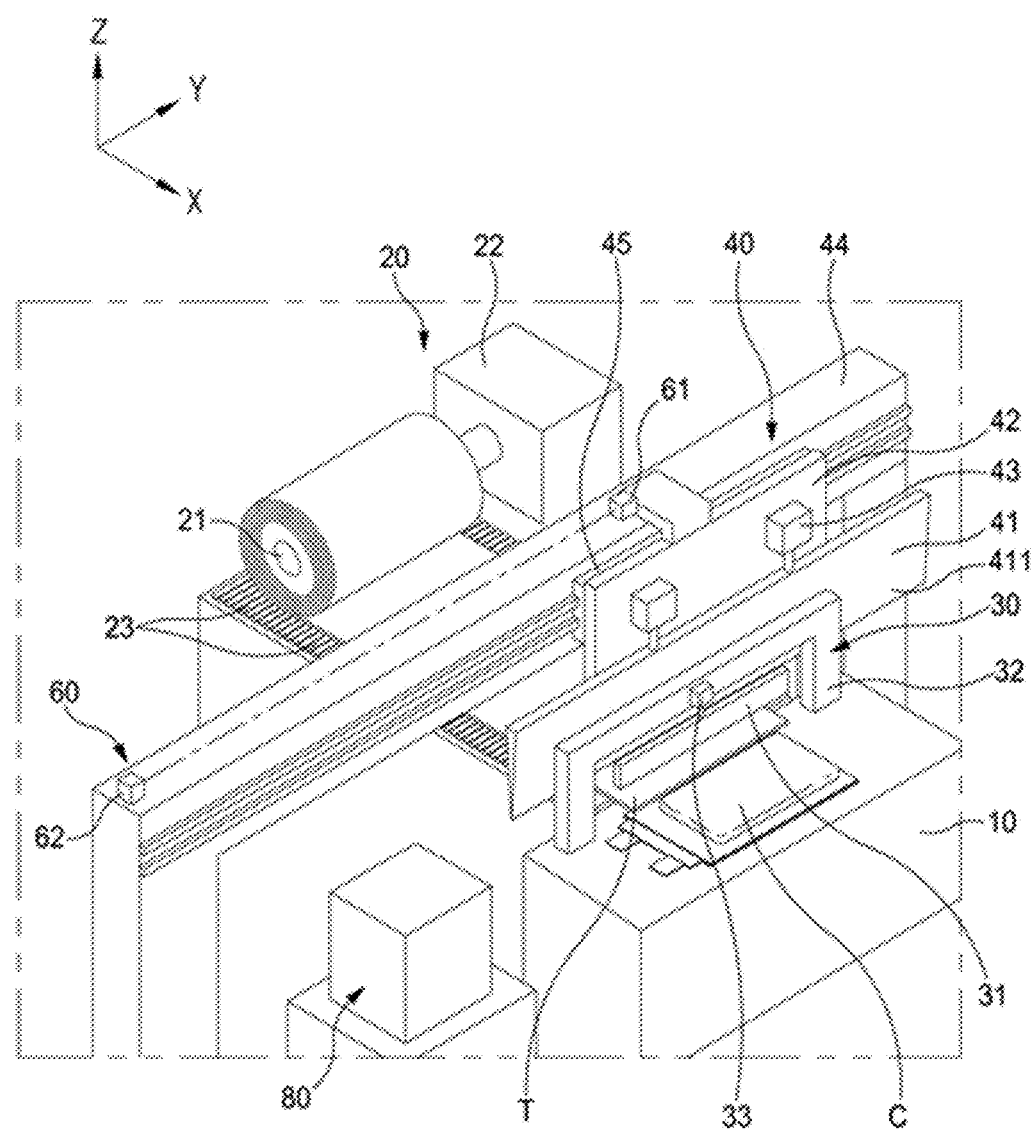

[FIG. 2]
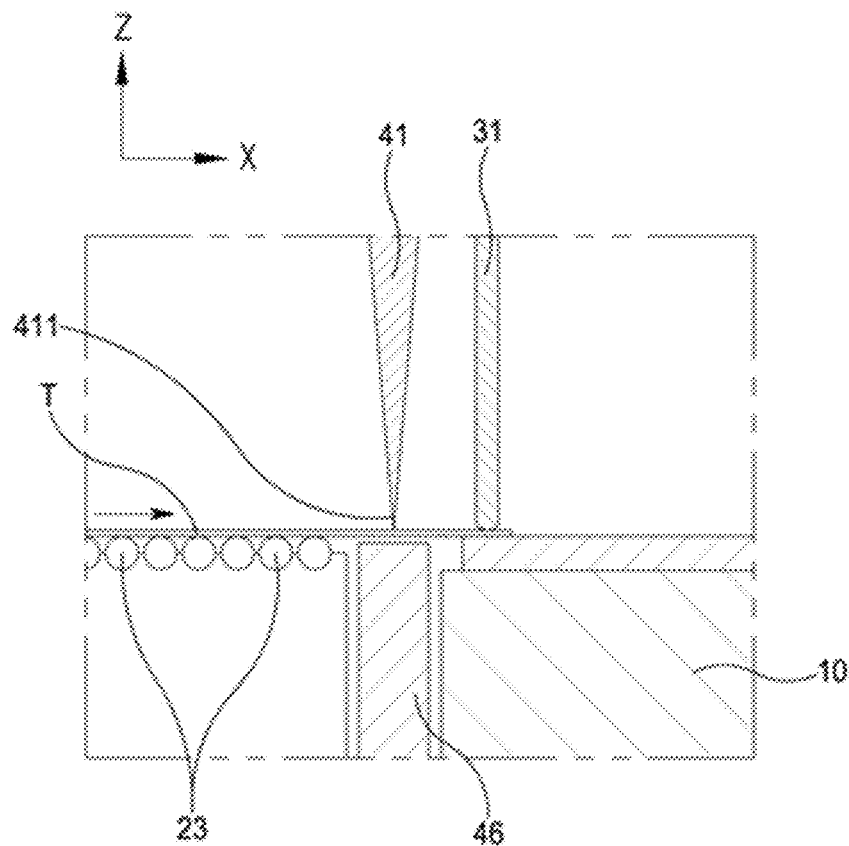
[FIG. 3]
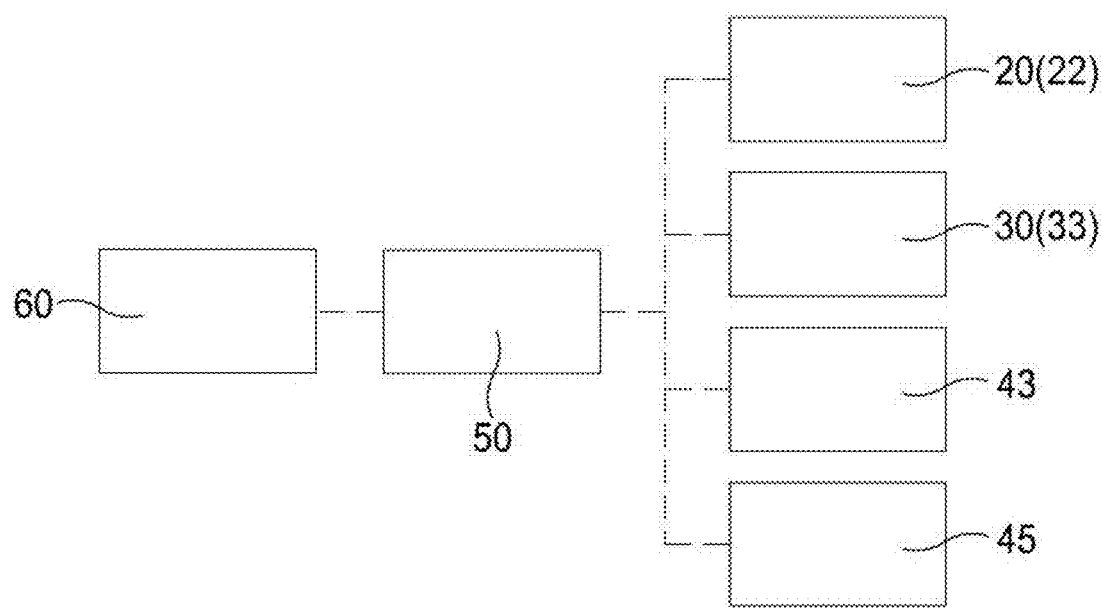

[FIG. 4]
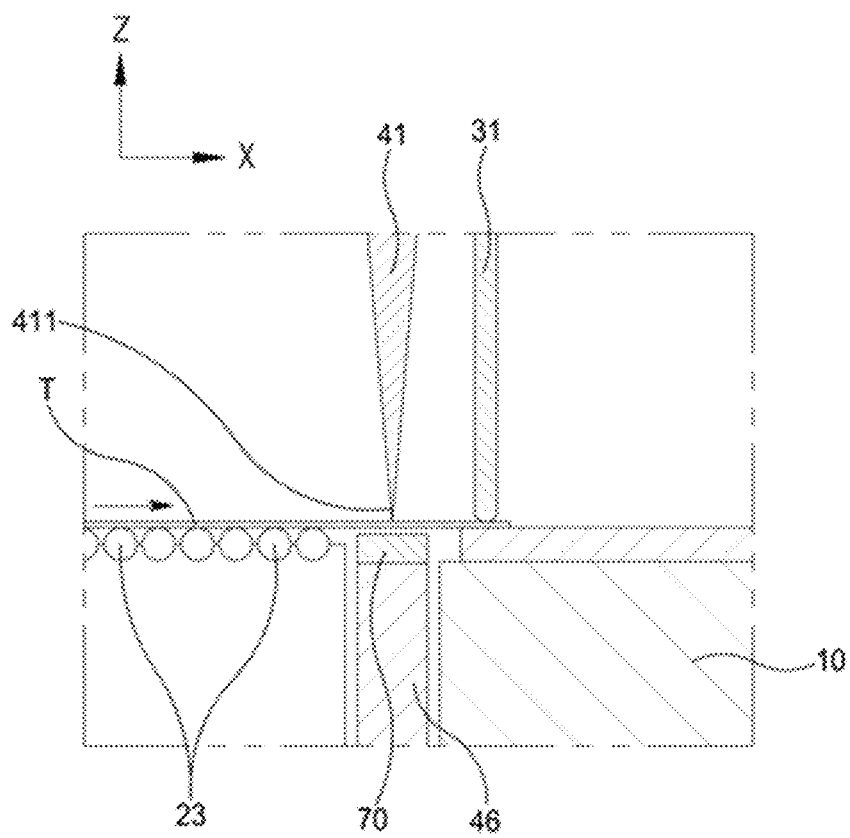
[FIG. 5]
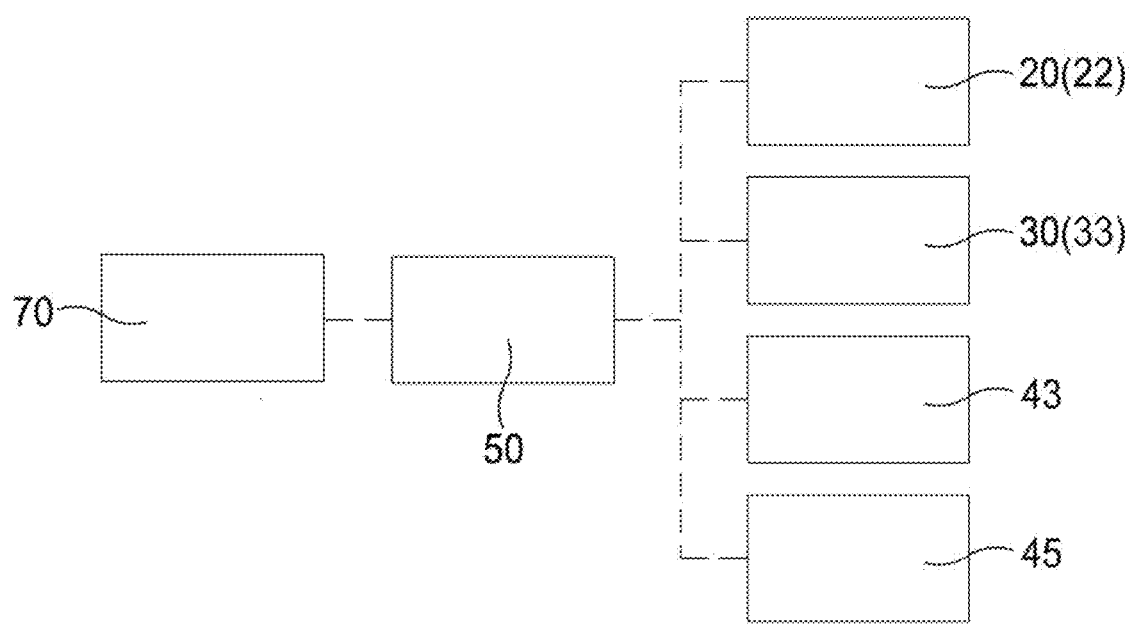

[FIG. 6]
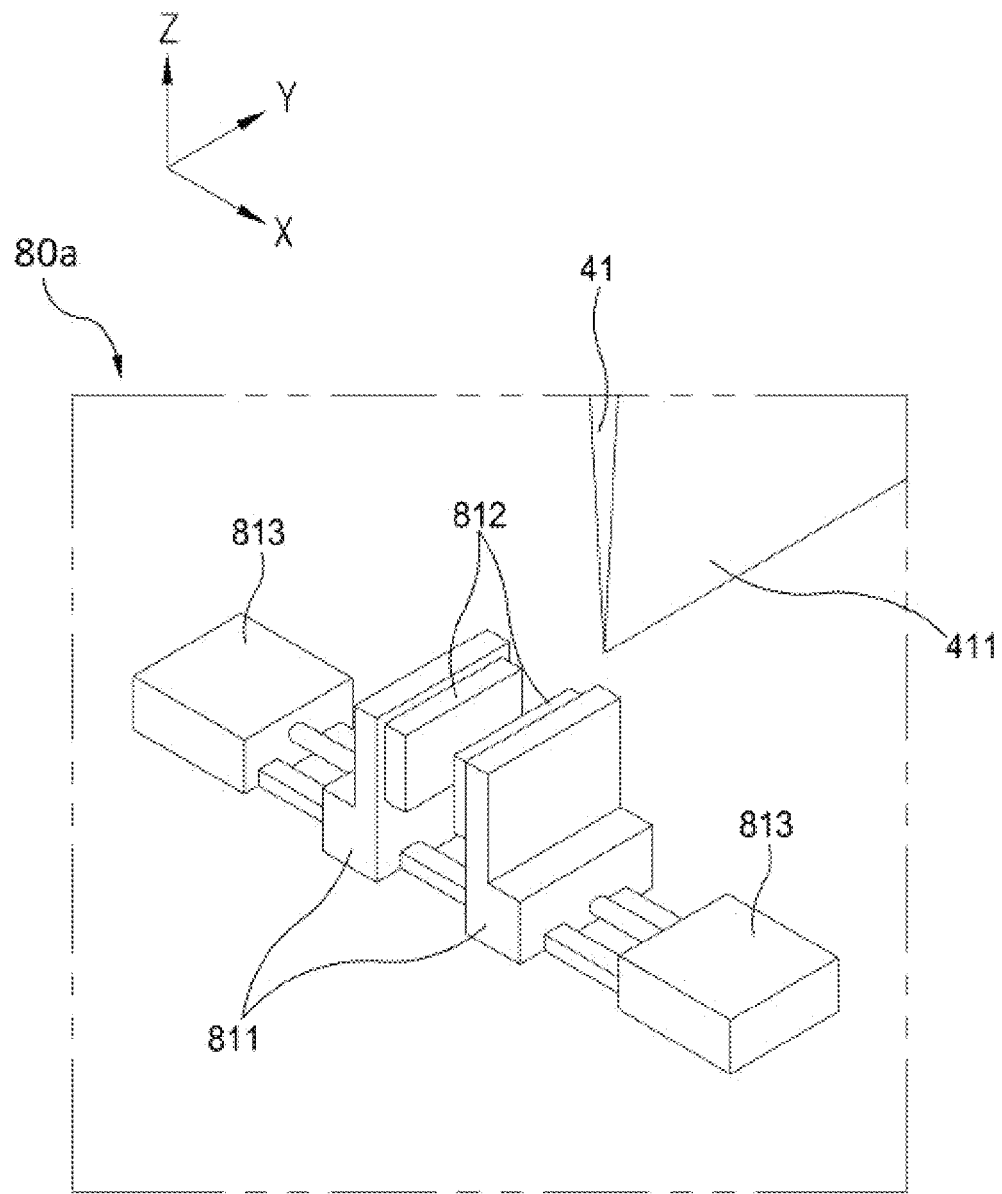

[FIG. 7]
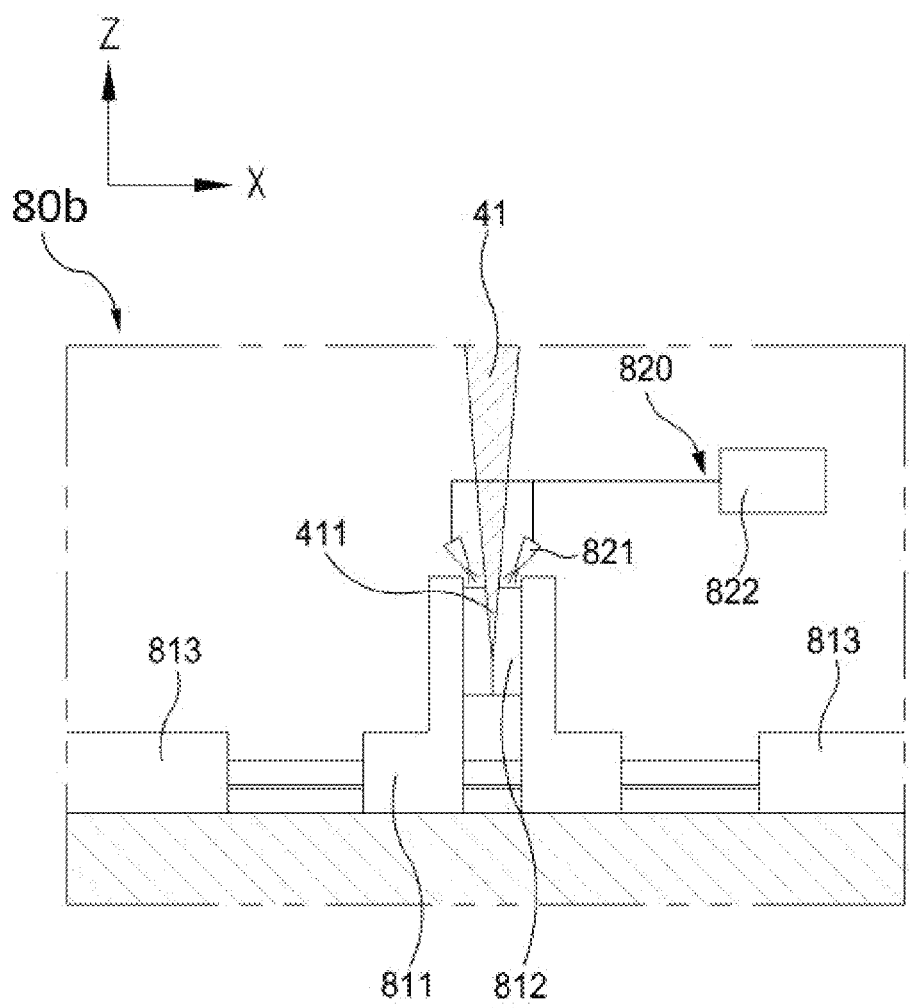

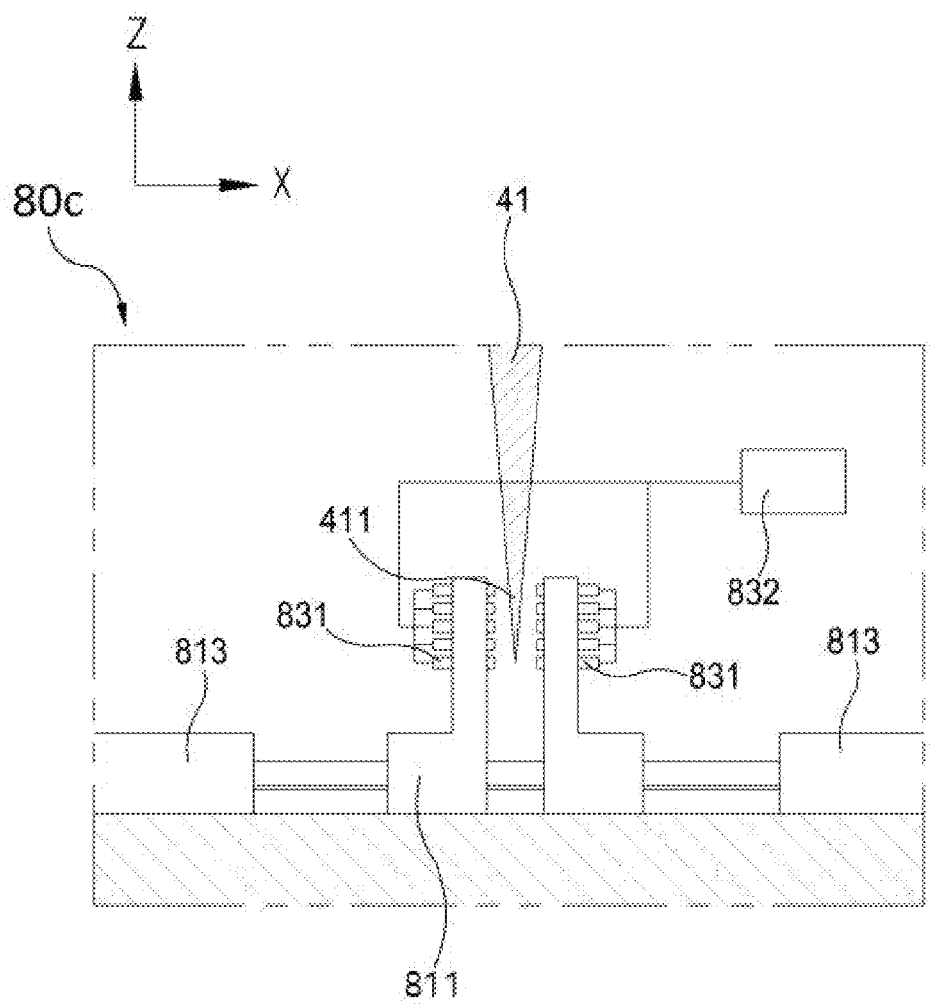
[FIG. 8]

[FIG. 9]
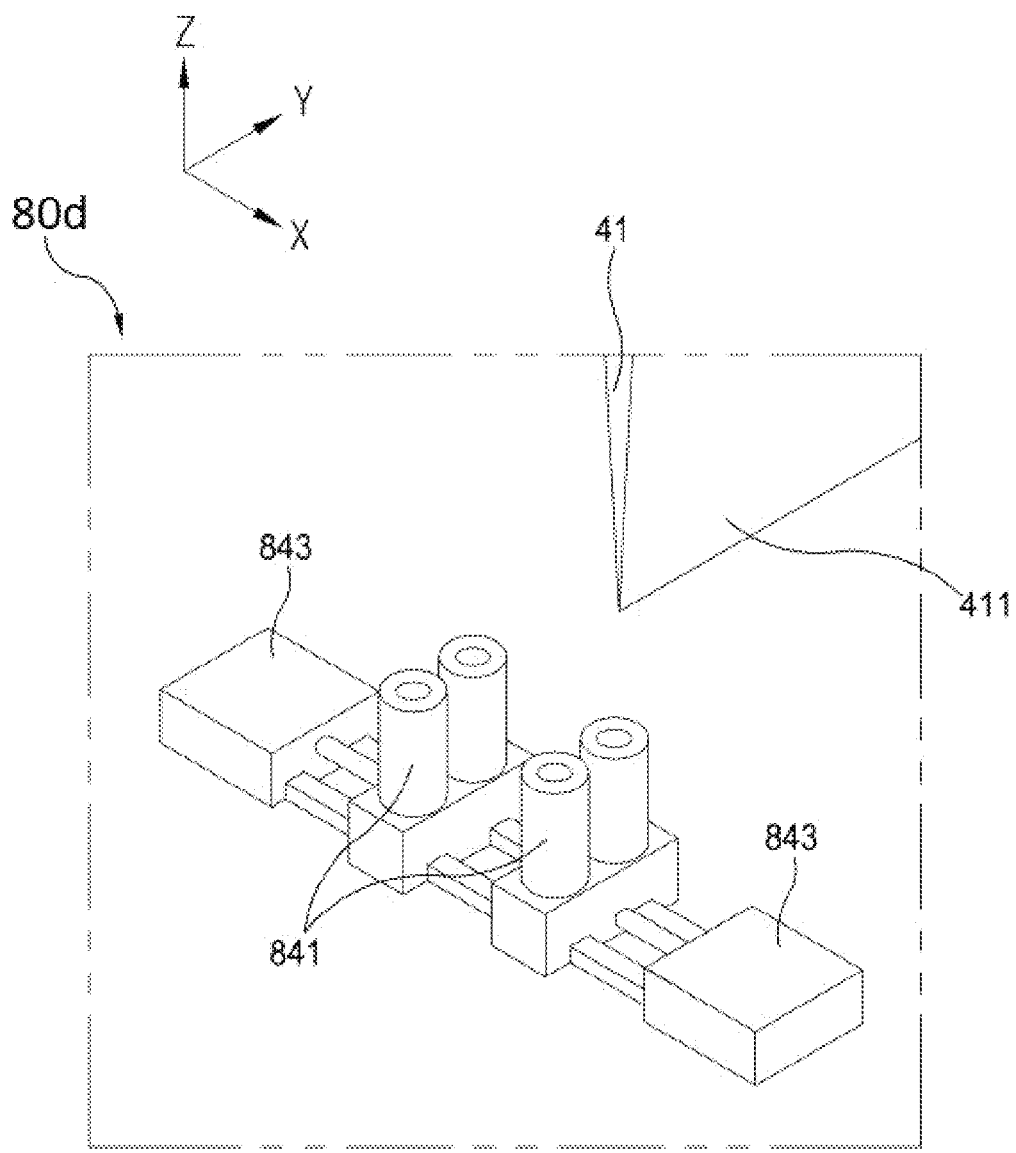

TAPE ATTACHMENT APPARATUS OF BATTERY CELL

TECHNICAL FIELD

This application claims the benefit of priority to Korean Patent Application No. 2018-0119086 filed on Oct. 5, 2018, the disclosure of which is hereby incorporated by reference herein its entirety.

The present invention relates to an apparatus configured to attach a tape to a battery cell.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in middle- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor.

The hybrid vehicle or the electric vehicle has an advantage in that fuel economy is high and no pollutants are discharged or the amount of pollutants that are discharged is reduced compared to a vehicle using only an internal combustion engine, since it is possible to obtain drive force from the battery pack. The battery pack used in the hybrid vehicle or the electric vehicle includes a battery module, which includes a plurality of battery cells. The plurality of battery cells are connected to each other in series and/or in parallel, whereby the capacity and output of the battery module are increased.

In the process of manufacturing a battery cell, a process of attaching various types of tapes to various components constituting a battery module or a battery cell is performed, such as attaching an insulating tape to sides of a pouch-shaped case accommodating a plurality of electrode assemblies. The process of attaching a tape includes a process of continuously feeding a tape and a process of cutting the tape into a size to be attached to a battery cell using a cutter.

Meanwhile, an adhesive having a predetermined adhesive force is applied to an adhesive portion, which is one surface of the tape attached to the battery cell. The adhesive may be attached to a cutting blade of the cutter in the process of cutting the tape. When the cutter is used for a long time, the adhesive is continuously attached to a portion used by the cutting blade of the cutter, and there is a problem in that the adhesive attached to the cutting blade of the cutter interferes with the cutting of the tape. In addition, the adhesive attached to the cutting blade of the cutter may be attached to a portion other than the adhesive portion of the cut tape, and such a tape may be attached to the battery cell as it is to deteriorate the quality of the battery cell.

In order to prevent the above-described problem, after the cutter is removed from the tape attachment apparatus, the adhesive is removed from the cutting blade of the cutter, and then the cutter is mounted on the tape attachment apparatus again. However, this process has a problem of increasing process time.

DISCLOSURE

Technical Problem

The present invention has been made in view of the above problems, and it is an object of the present invention to provide a tape attachment apparatus that is capable of preventing an adhesive from being attached only to a specific portion of a cutting blade of a cutter in the process of cutting a tape using the cutter.

Technical Solution

In accordance with an embodiment of the present invention, the above and other objects can be accomplished by the provision of a tape attachment apparatus comprising a tape feed unit configured to feed a tape to a battery cell; and a tape cutting unit configured to cut the tape fed from the tape feed unit, wherein the tape cutting unit comprises a cutter having a cutting blade with a larger width than a width of the tape and configured to cut the tape; a cutter elevation module configured to move the cutter in a Z-axis direction being perpendicular to a surface of the tape; and a cutter movement module configured to move the cutter in a Y-axis direction being perpendicular to a feeding direction of the tape.

In addition, the tape attachment apparatus in accordance with the embodiment the present invention may further comprise a control unit configured to calculate the number of cutting operations to cut the tape, and to control the cutter movement module to move the cutter in the Y-axis direction when the calculated number of cutting operations corresponds to a predetermined number.

The control unit may be connected to the cutter elevation module to calculate the number of reciprocating movements of the cutter reciprocating in the Z-axis direction by the cutter elevation module, and to calculate the number of the cutting operations based on the calculated number of reciprocating movements.

In addition, the tape attachment apparatus in accordance with the embodiment the present invention may further comprise a pressure sensor disposed to face the cutting blade of the cutter, the pressure sensor being configured to measure a pressing force when the cutting blade of the cutter presses the tape, wherein the control unit may calculate the number of the cutting operations based on the number of times the cutting blade of the cutter presses the pressure sensor.

In addition, the tape attachment apparatus in accordance with the embodiment the present invention may further comprise a position sensing unit configured to sense a position of the cutter in the Y-axis direction.

In addition, the tape attachment apparatus in accordance with the embodiment the present invention may further comprise a cleaning unit provided on one side in the Y-axis direction of the cutter, the cleaning unit being configured to clean the cutting blade of the cutter.

The cleaning unit may comprise a pair of cleaning members disposed on both sides of the cutter with a portion of the cutting blade of the cutter interposed therebetween; a cleaning pad attached to surfaces of the pair of cleaning members that face each other; and a cleaning member movement module configured to move the pair of cleaning members in a direction adjacent to each other or in a direction spaced apart from each other.

The cleaning unit may further comprise a cleaning liquid supply module configured to supply a cleaning liquid to the cleaning pad.

The cleaning unit may comprise a plurality of suction nozzles disposed on both sides of the cutter with a portion of the cutting blade of the cutter interposed therebetween, each of the plurality of suction nozzles having a suction hole; and a negative pressure source connected to the suction holes of the plurality of suction nozzles, the negative pressure source being configured to apply negative pressure to the suction holes.

The cleaning unit may comprise a plurality of brushes disposed rotatably on both sides of the cutter with a portion of the cutting blade of the cutter interposed therebetween; and a brush movement module configured to move the plurality of brushes in a direction adjacent to each other or in a direction spaced apart from each other.

BRIEF DESCRIPTION OF DRAWINGS

FIG. 1 is a perspective view schematically showing a tape attachment apparatus according to a first embodiment of the present invention.

FIG. 2 is a sectional view schematically showing a portion of the tape attachment apparatus according to the first embodiment of the present invention.

FIG. 3 is a control block diagram showing the tape attachment apparatus according to the first embodiment of the present invention.

FIG. 4 is a sectional view schematically showing a portion of a tape attachment apparatus according to a second embodiment of the present invention.

FIG. 5 is a control block diagram showing the tape attachment apparatus according to the second embodiment of the present invention.

FIG. 6 is a perspective view showing a cleaning unit of a tape attachment apparatus according to a fourth embodiment of the present invention.

FIG. 7 is a perspective view showing another example of the cleaning unit of the tape attachment apparatus according to the fourth embodiment of the present invention.

FIG. 8 is a perspective view showing another example of the cleaning unit of the tape attachment apparatus according to the fourth embodiment of the present invention.

FIG. 9 is a perspective view showing further example of the cleaning unit of the tape attachment apparatus according to the fourth embodiment of the present invention.

DETAILED DESCRIPTION OF THE INVENTION

Hereinafter, a tape attachment apparatus according to embodiments of the present invention will be described with reference to the accompanying drawings.

As a first embodiment of the present invention, as shown in FIGS. 1 to 3, a tape attachment apparatus may comprise a stage 10 on which a battery cell C is mounted and supported; a tape feed unit 20 configured to feed a tape T to the stage 10; a tape pressing unit 30 configured to press the tape T fed from the tape feed unit 20 to the battery cell C; a tape cutting unit 40 disposed between the tape feed unit 20 and the tape pressing unit 30, the tape cutting unit 40 being configured to cut the tape T to a predetermined size; and a control unit 50 configured to control an operation of the tape attachment apparatus.

Hereinafter, a direction in which the tape T is fed by the tape feed unit 20 is defined as an X-axis direction. A direction perpendicular to the X-axis direction is defined as a Y-axis direction (width direction of the tape T), and a direction perpendicular to a X-Y plane is defined as a Z-axis direction (direction perpendicular to the surface of the tape T).

The stage 10, for example, may be configured to be connected to a vacuum source to adsorb the battery cell C. The battery cell C may be seated on the stage 10 such that a portion of the battery cell C to which the tape T is to be attached (for example, sides of a pouch-shaped case) is directed to face where the tape T is fed.

The tape feed unit 20 may include a tape feed reel 21 in which the tape T is wound in a roll shape; a reel drive module 22 which rotates the tape feed reel 21 so as to unwind the tape T from the tape feed reel 21; and a plurality of transfer rollers 23 configured to transfer the tape T unwound from the tape feed reel 21 toward the stage 10 in the X-axis direction. Therefore, by the tape feed reel 21 being rotated by the reel drive module 22, the Tape T may be unwound from the tape feed reel 21, and the tape T unwound from the tape feed reel 21 may be transferred to the stage 10 by the plurality of transfer rollers 23.

The tape pressing unit 30, for example, may include a pressing member 31 configured to press the tape T to the battery cell C; a pressing member support 32 configured to support the pressing member 31; and a pressing member movement module 33 provided on the pressing member support 32 and connected to the pressing member 31 so as to move the pressing member 31 in the Z-axis direction.

The pressing member 31 serves to attach the tape T to the battery cell C by pressing a leader end of the tape T fed to the stage 10 to the battery cell C. A tip of the pressing member 31 in contact with the tape T may be formed in a curved shape.

The pressing member support 32 may be provided over an upper portion of the stage 10. The pressing member support serves to support the pressing member 31 so that the pressing member 31 is movable in the Z-axis direction.

The pressing member movement module 33, for example, may be configured as a linear moving mechanism such as an actuator operated by pneumatic or hydraulic pressure; a linear motor operated by electromagnetic interaction; or a ball screw mechanism. The pressing member movement module 33 moves the pressing member 31 in the Z-axis direction so that the pressing member 31 presses the tape T to the battery cell C. As the pressing member 31 presses the tape T to the battery cell C, the tape T may be attached to the battery cell C.

The tape cutting unit 40, for example, may include a cutter 41 having a cutting blade 411 in a direction facing the tape T; a cutter head 42 configured to support the cutter 41; a cutter elevation module 43 provided on the cutter head 42 to move the cutter 41 in the Z-axis direction; a head support 44 configured to support the cutter head 42 so as to move the cutter head 42 in the Y-axis direction; a cutter movement module 45 provided on the head support 44 to move the cutter head 42 in the Y-axis direction; and a cutter table 46 disposed to face the cutting blade 411 of the cutter 41 with the tape T therebetween.

The cutting blade 411 of the cutter 41 may have a larger width than a width of the tape T. Therefore, only a portion of the cutting blade 411, not the entire area of the cutting blade 411, may be used to the tape T. As the cutter 41 moves at a predetermined distance in the Y-axis direction, the area of the cutting blade 411 used for cutting the tape T may be changed.

The cutter head 42 serves to support the cutter 41 so that the cutter 41 may be able to move in the Z-axis direction. The cutter head 42 may be moved in the Y-axis direction along the head support 44 by the cutter movement module 45. As the cutter head 42 is moved in the Y-axis direction along the head support 44 by the cutter movement module 45, the cutter 41 may be moved at a predetermined distance in the Y-axis direction. As a result, the area of the cutting blade 411 used for cutting the tape T may be changed.

The cutter elevation module 43, for example, may be configured as a linear moving mechanism such as an actuator operated by pneumatic or hydraulic pressure; a linear motor operated by electromagnetic interaction; or a ball screw mechanism.

The head support 44 may be provided over an upper portion of the tape T fed by the tape feed unit 20.

The cutter movement module 45, for example, may be configured as a linear moving mechanism such as an actuator operated by pneumatic or hydraulic pressure; a linear motor operated by electromagnetic interaction; or a ball screw mechanism.

The cutter table 46 serves to support the cutting blade 411 of the cutter 41 when the cutter 41 cuts the tape T.

The tape attachment apparatus according to the embodiment of the present invention configured as described above moves the cutter 41 by a predetermined distance in the Y-axis direction, after the process of cutting the tape T using the portion of the cutting blade 411 of the cutter 41 is performed a predetermined number of times. As a result, the area of the cutting blade 411 used for cutting the tape T is changed. Therefore, it is possible to prevent using only a specific area of the entire area of the cutting blade 411 of the cutter 41 to cut the tape T. Consequently, it is possible to prevent an adhesive of the tape T from attaching to only the specific area of the cutting blade 411 of the cutter 41.

For example, the tape attachment apparatus according to the embodiment of the present invention may be configured to move the cutter 41 in the Y-axis direction at 5 mm after 1,000 operations of cutting the tape T. Therefore, after using the cutter 41 for a predetermined number of times as described above, then the cutter 41 is moved in the Y-axis direction so that the area of the cutting blade 411 used for cutting the tape T may be changed. Therefore, it is possible to prevent the adhesive from being continuously attached to a specific portion of the cutting blade 411 to interrupt the cutting of the tape T, and it is possible to prevent the tape T and peripheral components from being contaminated by the adhesive.

To this end, a control unit 50 may be configured to calculate the number of cutting operations for cutting the tape T, and may be configured to control the cutter movement module to move the cutter 41 in the Y-axis direction when the calculated number of cutting operations corresponds to a predetermined reference number. Here, the reference number may be determined through experiment or simulation. In case in which, when a specific area of the cutting blade 411 is used to cut the tape T, the adhesive attached to the corresponding area of the cutting blade 411 does not cause a problem such as interrupting the cutting of the tape T, the reference number may be determined based on the number of times the corresponding area of the cutting blade 411 is used. That is, the reference number may be the number of times the corresponding area of the cutting blade 411 is used until the adhesive attached to the corresponding area of the cutting blade 411 does not cause a problem.

The control unit 50 may be connected to the cutter elevation module 43 to calculate the number of cutting operations. The control unit 50 may calculate the number of reciprocating movements of the cutter 41 reciprocating in the Z-axis direction by the cutter elevation module 43, and may calculate the number of cutting operations based on the calculated number of reciprocating movement.

As a second embodiment of the present invention, as shown in FIGS. 4 and 5, the tape attachment apparatus may further include a pressure sensor 70 disposed on the upper end of the cutter table 46 to face the cutting blade 411 of the cutter 41 with the tape T therebetween. The pressure sensor 70 serves to measure the pressing force when the cutting blade 411 of the cutter 41 presses the tape T. For example, the pressure sensor 70 may include a load cell.

The control unit 50 may be connected to the pressure sensor 70. The control unit 50 may calculate the number of cutting operations based on the number of times the cutting blade 411 of the cutter 41 presses the pressure sensor 70. Similarly, when the calculated number of cutting operations corresponds to a predetermined reference number, the control unit 50 may control the cutter movement module 45 to move the cutter 41 in the Y-axis direction.

As a third embodiment of the present invention, as shown in FIGS. 1, 3 and 5, the tape attachment apparatus may include a position sensing unit 60 configured to sense a position of the cutter 41 in the Y-axis direction. The position sensing unit 60 may include a first member 61 provided in the cutter head 42 and a second member 62 provided in the head support 44. The position sensing unit 60 may sense the position of the cutter 41 in the Y-axis direction by measuring the distance between the first member 61 and the second member 62. For example, one of the first member 61 and the second member 62 may be a light emitting portion for emitting light, and the other may be a light receiving portion for receiving light emitted from the light emitting portion. In this case, it is possible to measure a distance between the first member 61 and the second member 62 by measuring the intensity, the wavelength, and the like of the light emitted from the light emitting portion when the light is received by the light receiving portion. As another example, one of the first member 61 and the second member 62 may be a camera and the other may be a mark captured by the camera. In this case, it is possible to measure a distance between the first member 61 and the second member 62 by measuring the focal length of the camera and the like from the image of the mark captured by the camera.

The control unit 50 may be connected to the position sensing unit 60. The control unit 50 may detect a moving direction, a current position, a moving distance, and the like of the cutter 41 based on the position information of the cutter 41 sensed by the position sensing unit 60. Therefore, when the number of cutting operations, which is the number of times a specific area of the cutting blade 411 of the cutter 41 is used to cut the tape T, corresponds to a predetermined reference number, it is possible that the control unit 50 may accurately move the cutter 41 at a predetermined distance in the Y-axis direction based on the position information of the cutter 41 sensed by the position sensing unit 60.

As a fourth embodiment of the present invention, as shown in FIGS. 1 and 6 to 9, the tape attachment apparatus may include varied arrangements of a cleaning unit 80 (for example, as illustrated as cleaning units 80a-80d) provided on one side of the cutter 41 in the Y-axis direction and configured to clean the cutting blade 411 of the cutter 41. The cutter 41 may approach the cleaning unit 80 of FIG. 1 by moving the cutter 41 in the Y-axis direction by the cutter movement unit 45.

As an example of the fourth embodiment of the present invention, as shown in FIG. 6, the cleaning unit 80a may include a pair of cleaning members 811 disposed on both sides of the cutter 41 with a portion of the cutting blade 411 of the cutter 41 interposed therebetween; a cleaning pad 812 attached to surfaces of the pair of cleaning members 811 that face each other; and a cleaning member movement module 813 configured to move the pair of cleaning members 811 in a direction adjacent to each other or in a direction spaced apart from each other. The cleaning member movement module 813, for example, may be configured as a linear moving mechanism such as an actuator operated by pneumatic or hydraulic pressure; a linear motor operated by electromagnetic interaction; or a ball screw mechanism. According to such a configuration, when the cutting blade 411 of the cutter 41 approaches the cleaning unit 80a due to the movement of the cutter 41 in the Y-axis direction by the cutter movement unit 45, the cleaning member movement module 813 is operated to move the pair of cleaning members 811 in a direction adjacent to each other, whereby the pair of cleaning pads 812 may be in close contact with the cutting blade 411 of the cutter 41. At this time, as the cutter 41 continues to move in the Y-axis direction by the cutter movement unit 45, the adhesive attached to the cutting blade 411 of the cutter 41 may be removed from the cutting blade 411 of the cutter 41 by the pair of cleaning pads 812.

As another example of the fourth embodiment of the present invention, as shown in FIG. 7, the cleaning unit 80b may further include a cleaning liquid supply module 820 configured to supply the cleaning liquid to the cleaning pad 812. The cleaning liquid supply module 820 may include a cleaning liquid injection nozzle 821 disposed adjacent to the cleaning pad 812, and a cleaning liquid supply part 822 configured to supply the cleaning liquid to the cleaning liquid injection nozzle 821. The cleaning liquid supplied from the cleaning liquid supply module 820 may include a material capable of dissolving the adhesive of the tape T. Since the cleaning liquid is supplied to the cleaning pad 812 by the cleaning liquid supply module 820, it is possible to remove the adhesive more easily from the cutting blade 411 of the cutter 41.

As another example of the fourth embodiment of the present invention, as shown in FIG. 8, the cleaning unit 80c may include a plurality of suction nozzles 831 disposed on both sides of the cutter 41 with the cutting blade 411 of the cutter 41 interposed therebetween, each of the plurality of suction nozzles 831 having a suction hole; and a negative pressure source 832 connected to the suction holes of the plurality of suction nozzles 831, the negative pressure source 832 being configured to apply negative pressure to the suction holes. According to such a configuration, when the cutting blade 411 of the cutter 41 approaches the cleaning unit 80c due to the movement of the cutter 41 in the Y-axis direction by the cutter movement unit 45, the negative pressure source 832 is operated to apply negative pressure on the suction holes of the plurality of suction nozzles 831, whereby the adhesive attached to the cutting blade 411 of the cutter 41 may be removed from the cutting blade 411 while being sucked into the suction hole.

As another example of the fourth embodiment of the present invention, as shown in FIG. 9, the cleaning unit 80d may include a plurality of brushes 841 disposed rotatably on both sides of the cutter 41 with the cutting blade 411 of the cutter 41 interposed therebetween; and a brush movement module 843 configured to move the plurality of brushes 841 in a direction adjacent to each other or in a direction spaced apart from each other. According to such a configuration, when the cutting blade 411 of the cutter 41 approaches the cleaning unit 80d due to the movement of the cutter 41 in the Y-axis direction by the cutter movement unit 45, the brush movement module 843 is operated to move the plurality of brushes 841 in a direction adjacent to each other, whereby the plurality of brushes 841 may be in close contact with the cutting blade 411 of the cutter 41. At this time, as the cutter 41 continues to move in the Y-axis direction by the cutter movement unit 45, the adhesive attached to the cutting blade 411 of the cutter 41 may be removed from the cutting blade 411 of the cutter 41 while the plurality of brushes 841 rotate.

Meanwhile, the embodiments of the cleaning unit 80a-80d described with reference to FIGS. 6 to 9 may be performed individually or in combination with each other. For example, the cleaning liquid supply module 820 may be provided in the embodiments of the cleaning unit 80a-80d, including the cleaning unit 80d having the brush 841.

Although the preferred embodiments of the present invention have been described by way of illustration, the scope of the present invention is not limited to the specific embodiments described herein, and the present invention can be appropriately modified within the category described in the claims.

INDUSTRIAL APPLICABILITY

A tape attachment apparatus according to embodiments of the present invention is configured to move a cutter in a Y-axis direction after using the cutter a predetermined number of times, whereby it is possible to change an area of a cutting blade used for cutting a tape. Therefore, it is possible to prevent an adhesive from being continuously attached to a specific portion of the cutting blade to interrupt the cutting of the tape, and it is possible to prevent the tape and peripheral components from being contaminated by the adhesive.

DESCRIPTION OF REFERENCE NUMERALS

10: Stage
20: Tape feed unit
30: Tape pressing unit
40: Tape cutting unit
50: Control unit
60: Position sensing unit
70: Pressure sensor
80: Cleaning unit

The invention claimed is:

1. A tape attachment apparatus comprising:
a tape;
a battery cell;
a stage on which the battery cell is seated such that a portion of the battery cell to which the tape is to be attached faces the tape;
a tape feeder configured to feed the tape in an X-axis direction to the battery cell;
a tape pressing unit configured to press the tape to the battery cell; and
a tape cutting unit configured to cut the tape fed from the tape feeder while the tape is pressed to the battery cell,
wherein the tape pressing unit comprises:
a pressing member configured to attach the tape to the battery cell by pressing a leading end of the tape fed to the stage to the battery cell;
a pressing member support configured to support the pressing member; and
a pressing member movement module provided on the pressing member support and connected to the pressing member so as to move the pressing member in a Z-axis direction,
wherein the tape cutting unit comprises:

a cutter having a cutting blade, the cutting blade with a larger width than a width of the tape, and the cutter being disposed such that a first portion of the cutting blade is configured to contact the tape and to cut the tape during first cutting operations, wherein a second portion of the cutting blade does not contact the tape during the first cutting operations;

a cutter elevation module comprising a motor, the cutter elevation module configured to move the cutter in the Z-axis direction, the Z-axis direction being perpendicular to a surface of the tape; and a cutter movement module comprising a linear moving mechanism, the cutter movement module configured to move the cutter in a Y-axis direction being perpendicular to both the X-axis direction and the Z-axis direction, wherein, after the first cutting operations, the cutter movement module is configured to move the cutter to be disposed such that the second portion of the cutting blade is configured to contact the tape and to cut the tape during second cutting operations, wherein the first portion of the cutting blade does not contact the tape during the second cutting operations, and wherein the first portion is different than the second portion.

2. The tape attachment apparatus according to claim 1, further comprising a position sensing unit configured to sense a position of the cutter with respect to the Y-axis direction.

3. The tape attachment apparatus according to claim 1, further comprising a cleaning unit provided on one side of the cutter with respect to the Y-axis direction, wherein the cleaning unit comprises a cleaning liquid to clean the cutting blade of the cutter, and wherein the cutter movement module is configured to move the cutter in the Y-axis direction to the cleaning unit.

4. The tape attachment apparatus according to claim 1, further comprising a controller configured to calculate a number of cutting operations to cut the tape, and to control the cutter movement module to move the cutter in the Y-axis direction when the number of the cutting operations corresponds to a predetermined number, wherein the first cutting operations occur before the number of cutting operations corresponds to the predetermined number, and wherein the second cutting operations occur after the number of cutting operations corresponds to the predetermined number.

5. The tape attachment apparatus according to claim 4, wherein the controller is connected to the cutter elevation module to calculate a number of reciprocating movements of the cutter reciprocating in the Z-axis direction by the cutter elevation module, wherein the controller is configured to calculate the number of the cutting operations based on the number of reciprocating movements.

6. The tape attachment apparatus according to claim 4, further comprising a pressure sensor disposed to face the cutting blade of the cutter, the pressure sensor being configured to measure a pressing force when the cutting blade of the cutter presses the tape, wherein the controller is configured to calculate the number of the cutting operations based on the number of times the cutting blade of the cutter presses the pressure sensor.

7. The tape attachment apparatus according to claim 1, wherein the tape cutting unit configured to cut the tape at a portion of the tape between the tape feeder and the battery cell.

8. A tape attachment apparatus comprising:

a tape;

a battery cell;

a stage on which the battery cell is seated such that a portion of the battery cell to which the tape is to be attached faces the tape;

a tape feeder configured to feed the tape in a lateral direction to the battery cell;

a tape pressing unit configured to attach the tape to the battery cell by pressing a leading end of the tape fed to the stage to the battery cell; and a tape cutting unit configured to cut the tape fed from the tape feeder while the tape is pressed to the battery, the tape cutting unit including:

a cutter having a cutting blade, the cutting blade being configured to cut the tape and being transversely disposed in a first cutting position during first cutting operations;

a cutter elevation module comprising a motor, the cutter elevation module configured to move the cutter in a vertical direction, the vertical direction being perpendicular to the lateral direction; and a cutter movement module comprising a linear moving mechanism, the cutter movement module configured to move the cutter in a transverse direction perpendicular to the both the lateral and vertical directions, the cutter movement module being configured to move the cutter from the first cutting position to a second cutting position such that the second cutting position is shifted in the transverse direction relative to the first cutting position, wherein the tape pressing unit comprises:

a pressing member configured to press the tape to the battery cell;

a pressing member support configured to support the pressing member; and a pressing member movement module provided on the pressing member support and connected to the pressing member so as to move the pressing member in the vertical direction, and wherein the cutter is transversely disposed at the second cutting position during second cutting operations after the first cutting operations.

9. The tape attachment apparatus according to claim 8, further comprising a controller configured to calculate a number of tape cutting operations performed, and to control the cutter movement module to move the cutter from the first cutting position to the second cutting position when the number of the tape cutting operations performed corresponds to a predetermined number, wherein, during each cutting operation before the number of cutting operations corresponds to the predetermined number, the cutter is disposed at the first cutting position.

10. The tape attachment apparatus according to claim 9, wherein the controller is configured to calculate the number of the tape cutting operations performed based on calculating a number of vertical reciprocating movements of the cutter.

11. The tape attachment apparatus according to claim 8, further comprising a cleaning unit disposed on one side of the cutter with respect to the transverse direction, wherein the cleaning unit comprises a cleaning liquid to clean the cutting blade of the cutter, and wherein the cutter movement module is configured to move the cutter in the transverse direction to the cleaning unit.

* * * * *